UNITED STATES PATENT OFFICE.

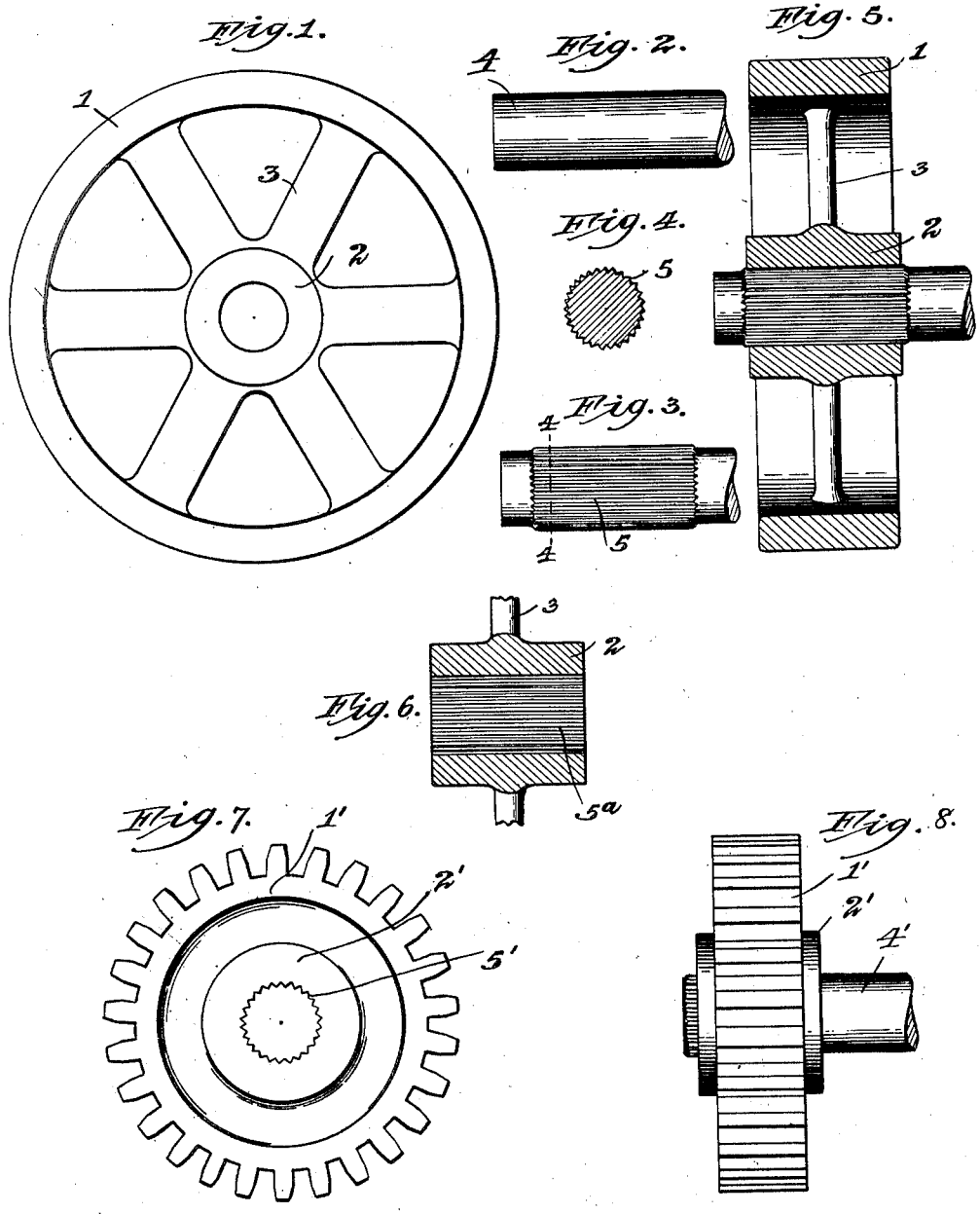

GEORGE M. BENNETT, OF KENOSHA, WISCONSIN.

METHOD OF SECURING AN APERTURED MEMBER TO A CYLINDRICAL MEMBER.

1,157,666. Specification of Letters Patent. Patented Oct. 26, 1915.

Application filed July 27, 1914. Serial No. 853,339.

*To all whom it may concern:*

Be it known that I, GEORGE M. BENNETT, a subject of the King of Great Britain, and a resident of the city of Kenosha, county of Kenosha, and State of Wisconsin, have invented certain new and useful Improvements in Methods of Securing an Apertured Member to a Cylindrical Member, of which the following is a specification.

This invention relates to improvements in methods of securing an apertured member to a cylindrical member, and refers more particularly to the securing of collars, rings, wheels, pulleys, gears and the like to a shaft, although in its broader aspects the invention is not limited to the uses specified, as it might be advantageous in other cases where it was desired to secure an apertured member to a cylindrical member of any kind.

Among the salient objects of the invention are to provide an improved method of securing members of the character described from their independent rotative movement by interlocking connections between the opposed meeting surfaces of the members without the removal of any appreciable amount of the material from either or both of said surfaces; to provide a construction in which to accomplish the foregoing object, the periphery of one of said members is provided with a series of longitudinally extending serrations or dentations formed circumferentially around said periphery and formed by nurling, milling, rolling or otherwise; to provide a construction in which preferably the apertured member is forced onto the cylindrical member, the cylindrical member being of greater diameter than said apertured member, so that said serrations or dentations become embedded in and interlock with the opposed periphery of the other member; to provide a construction which is more particularly adapted for locking of metallic members; to provide a construction in which the metal of said members is utilized as a locking element without removal of any appreciable amount of the metal from either of said members, and in which this may be accomplished without essentially weakening either member; to provide a simple and economical method of accomplishing the foregoing objects, and in general to provide a novel method of the character described.

My invention consists in the matters hereinafter described and more particularly pointed out in the appended claim.

In the drawings—Figure 1 is a side elevation of a fly wheel. Fig. 2 is a fragmentary perspective view of a plain shaft. Fig. 3 is a view similar to Fig. 2 but showing part of the periphery of said shaft provided with a series of longitudinally extending serrations or dentations. Fig. 4 is a sectional view taken on lines 4—4 of Fig. 3. Fig. 5 is a sectional view of the fly wheel showing the parts in assembled position. Fig. 6 is a sectional view of the hub showing the shaft removed. Fig. 7 is a side elevation of a gear in which its inner periphery is provided with longitudinally extending serrations. Fig. 8 shows this gear in position on a plain shaft.

As is well known, the common method of securing a wheel, pulley, gear or the like, to a shaft so as to lock the members against independent rotative movement, is by means of a key and key-ways. These members have been also secured together by such extraneous fastening devices as clamps, set screws, pins and the like, and also by shrinking the gear, pulley or other member on the shaft. All of these various fastening devices or methods are useful for certain purposes, and are also open to certain objections as is well known. My invention is more particularly adapted to take the place of the keys and key-ways, although there are many instances in which it may be better than any of the other methods mentioned.

One of the objections to keying a pulley or gear to a shaft is that it is necessary to cut out the key-ways, which results in the removal of a material amount of metal, and to this extent weakening both the shaft and the hub. Again, if it is desirable to shift the hub on the shaft a small distance it is necessary to extend the key-way. This results in further cutting of the metal and also leaves the old key-way not reinforced by the hub. Difficulty is also experienced in getting a full bearing surface. In practice there is an approximate standard size of key for a shaft of given diameter. This means that there is a practical limit to the bearing surface.

In the present invention it has been found in practice that a maximum bearing surface may be obtained without removing substantially any metal from either member. For example, in a 3" shaft the approximate standard key would be ¾" wide and ⅝" deep. The amount of metal removed from each member to form the key-way is approximately ¾" wide by 5/16" deep. Hence the effective bearing surface is approximately 5/16". In the present invention no appreciable amount of metal is removed, and the sum total of the bearing surface is approximately 2 inches. This is when the serrations are each .010 of an inch deep. It is obvious that a much more effective bearing surface is obtained in my invention, and also that it is much less expensive than the old method of keying the members together.

Referring to the drawings, 1 designates a fly wheel having hub 2, spokes 3.

4 designates a plain shaft (Fig. 2) which in Fig. 3 has been provided with a series of longitudinally extending serrations or dentations 5 which extend circumferentially of the shaft as shown more clearly in Fig. 4. These serrations or dentations may be formed by a knurl or otherwise. It is desirable, however, that they be formed without removing or cutting out any appreciable amount of metal. Their depth will depend somewhat upon the diameter of the shaft. In the practice of my invention I have found that the serrations on a 3" shaft are preferably .010 of an inch, and are preferably at an angle of 45 degrees to the axis of the shaft, although the foregoing may perhaps be varied to meet conditions. This gives a total bearing surface of approximately 2 inches. It is obvious that the diameter of the serrated shaft must be larger than the internal diameter of the hub. This is of course necessary in order to make the interlocking connections heretofore referred to.

The members are united by forcing the serrated shaft into the hub. The serrations of the shaft enter and become embedded in the inner surface of the hub. It is to be understood that in the present instance the hub is of softer metal than the serrations in the shaft. The two members are now securely united against independent rotative movement solely by the interlocking engagement between the serrations of the shaft and the opposed surface of the hub.

In Figs. 7 and 8 the serrations 5' are formed in the hub 2' of a gear 1', and this serrated hub is forced over a plain shaft 4' in the manner heretofore described. The interlocking engagement of the two members is of course just the reverse of the construction shown in Figs. 1 to 6.

It is to be understood of course that I have merely shown two applications of the present invention. It is obviously applicable for a wide variety of uses; and in its broader aspects is not limited to the details of construction shown or the specific method here above described, except as set forth in the appended claim. For example, the gear serrated as shown in Fig. 7 might be put on a shaft previously serrated as shown in Fig. 3 and still obtain the interlocking connections in question. This is especially so if the metal of the hub of the gear shown in Fig. 7 is of substantially the same density or hardness as the metal forming the shaft.

I claim as my invention:

The method of securing an apertured member to a cylindrical member to interlock said members against independent rotation, which comprises displacing the surface of one of said members to provide projecting serrations thus maintaining substantially the same amount of material in the portion of the member operated upon, and interlocking the serrations thus formed with the adjacent surface of the other member by forcing the cylindrical member into the apertured member.

GEORGE M. BENNETT.

Witnesses:
C. B. BELKNAP,
E. M. KLATCHER.